United States Patent
Li et al.

(10) Patent No.: US 8,467,795 B2
(45) Date of Patent: Jun. 18, 2013

(54) LOCATION-BASED ROUTING OF IMS CALLS THROUGH FEMTOCELLS

(75) Inventors: Mingxing Li, San Jose, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 12/726,618

(22) Filed: Mar. 18, 2010

(65) Prior Publication Data
US 2011/0230195 A1    Sep. 22, 2011

(51) Int. Cl.
*H04W 4/16* (2009.01)
(52) U.S. Cl.
USPC ......................................... 455/445; 455/456.5
(58) Field of Classification Search
USPC ................ 370/37, 352, 331, 338, 328, 332, 370/350, 356; 455/435.1, 456.1, 436, 411, 455/432.1
See application file for complete search history.

(56) References Cited

U.S. PATENT DOCUMENTS

| | | | |
|---|---|---|---|
| 2010/0189096 A1* | 7/2010 | Flynn et al. | 370/352 |
| 2010/0208703 A1* | 8/2010 | Tinnakornsrisuphap et al. | 370/331 |
| 2011/0002448 A1* | 1/2011 | Orwick et al. | 379/37 |

* cited by examiner

*Primary Examiner* — Kiet Doan

(57) ABSTRACT

Location-based calling may be provided for callers that connect to a wireless network using femtocells. A network device may receive a call initiation message including an identifier of a femtocell through which the call was placed. The network device may obtain an identifier of a macro cell base station that serves a geographical coverage area that includes the femtocell and replace the identifier of the femtocell, in the message, with the identifier of the macro cell base station, to obtain a modified message. The modified message may be forwarded through the network to be processed as if the caller placed the location-based call through the macro cell base station.

23 Claims, 11 Drawing Sheets

| SectorID | CALLED NUMBER/ SERVICE | REQUEST-URI |
|---|---|---|
| 10 | #PIZZA | SIP:PIZZA@JOESPIZZA.COM |
| 125 | #PIZZA | SIP:PIZZA@BOBSPIZZA.COM |
| 50 | 7035551212 | SIP:SERVICE@212.123.1.213 |
| ... | ... | ... |
| 1 | 4-1-1 | SIP:CALL@DIRASSIST.ORG |

Fig. 5

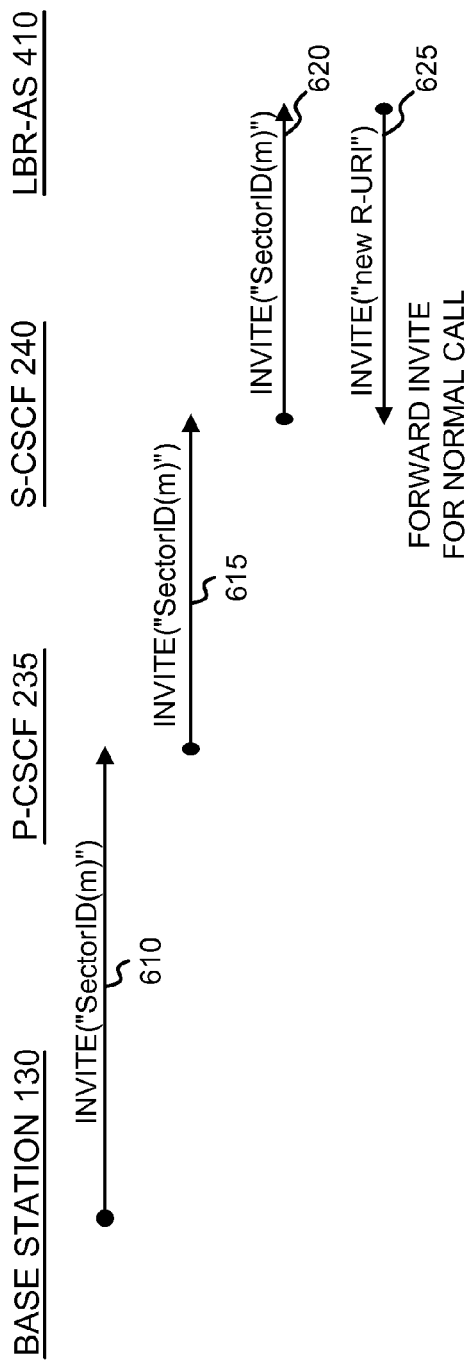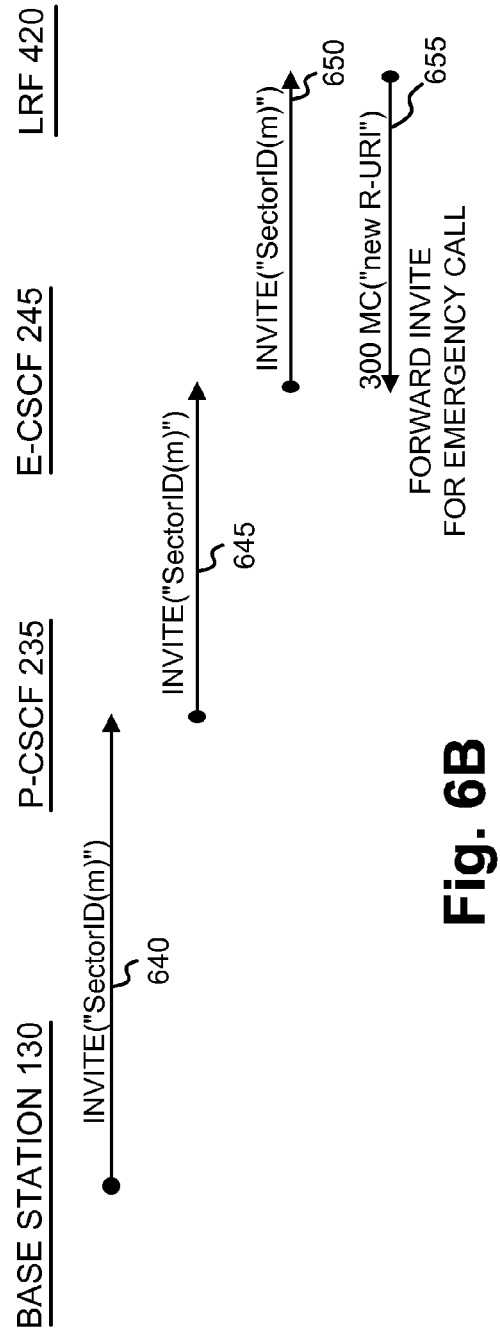

| SectorID(f) | SectorID(m) |
|---|---|
| f35 | 10 |
| f100 | 10 |
| f10 | 125 |
| ... | ... |
| f1 | 50 |

810 → SectorID(f); 820 → SectorID(m); 800

Fig. 8

LOCATION-BASED ROUTING OF IMS CALLS THROUGH FEMTOCELLS

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

Wireless networks may support location-based calling, in which a call initiated by a caller may be handled by the network based on the location of the user. For example, "N11" calls include a set of special abbreviated dialing numbers which allow access to special services. In an N11 call, such as a 9-1-1 call, the location of the wireless caller may be routed through the telephony network based on the location of the cell or sector to which the caller is assigned. Location-based calling may also be supported using network "short codes," in which a wireless caller may dial a special short code (e.g., five or six digits) instead of a normal, longer, telephone number.

In conventional wireless networks, such as a 1xRTT network, location-based calling may be implemented through mobile switching centers (MSCs) in the network. The MSCs may receive information identifying the cell or sector at which a call originated, and may use this information to route the call to an appropriate destination. For example, a 9-1-1 call may be routed to an emergency response center near the caller's location.

Internet Protocol (IP) multimedia subsystem (IMS) is a standard used to deliver IP multimedia to client devices. Under IMS, communication devices, such as mobile telephone devices, may connect to control servers that monitor and control the connectivity of the mobile device to the telecommunication network. IMS may be particularly used to enable multi-media services over IP networks.

In wireless IMS over IP networks, the physical network may include traditional wireless communication stations (macro cell base stations) installed at fixed locations and used to communicate with the wireless mobile terminals. Another type of base station, called a femtocell, may also be used in such networks. A femtocell may be a small wireless base station, typically designed for use in a home or small business. The femtocell may connect to a service provider's network via broadband (such as DSL or cable). A femtocell may allow service providers to extend service coverage indoors, especially where access would otherwise be limited or unavailable.

Because IMS over IP networks operate at a network layer above the wireless network, IMS may not track or record the location of a caller. It may, however, be desirable to provide location-based calling for wireless callers using IMS, including wireless callers that connect through femtocells in a IMS wireless network.

BRIEF DESCRIPTION OF THE DRAWINGS

FIG. 5 is a diagram illustrating an exemplary data structure that may be used when determining Request-URIs for location-based calling;

FIGS. 6A and 6B are diagrams illustrating exemplary call flows for performing location-based routing of calls through macro cell base stations;

FIG. 8 is a diagram illustrating an exemplary data structure that may be used when mapping the sector ID associated with a femtocell to the sector ID associated with a macro cell;

DETAILED DESCRIPTION

The following detailed description refers to the accompanying drawings. The same reference numbers in different drawings may identify the same or similar elements. Also, the following detailed description does not limit the invention.

Implementations described herein may include a telecommunication network for interconnecting a number of client devices. The telecommunication network may be, for example, a long term evolution (LTE) based network or a 3rd Generation Partnership Project (3GPP or 3G) based network, that provides IMS services to client wireless devices.

Location-based calling may particularly be provided for callers that connect through femtocells in the wireless network. Calls may be signaled in the network using the session initiation protocol (SIP). Mobile devices initiating a call using a femtocell may transmit a SIP INVITE message to the network. The SIP INVITE message may include an identification of the femtocell. If the call is a location-based call, the network may use the identification of the femtocell to lookup a second identifier, corresponding to a "macro cell" (e.g., a conventional base station in the wireless network). The identification of the femtocell may be replaced by the second identifier (i.e., the identifier of the macro cell base station) and the INVITE message may be forwarded through the network to complete the location-based call.

Figure 1:
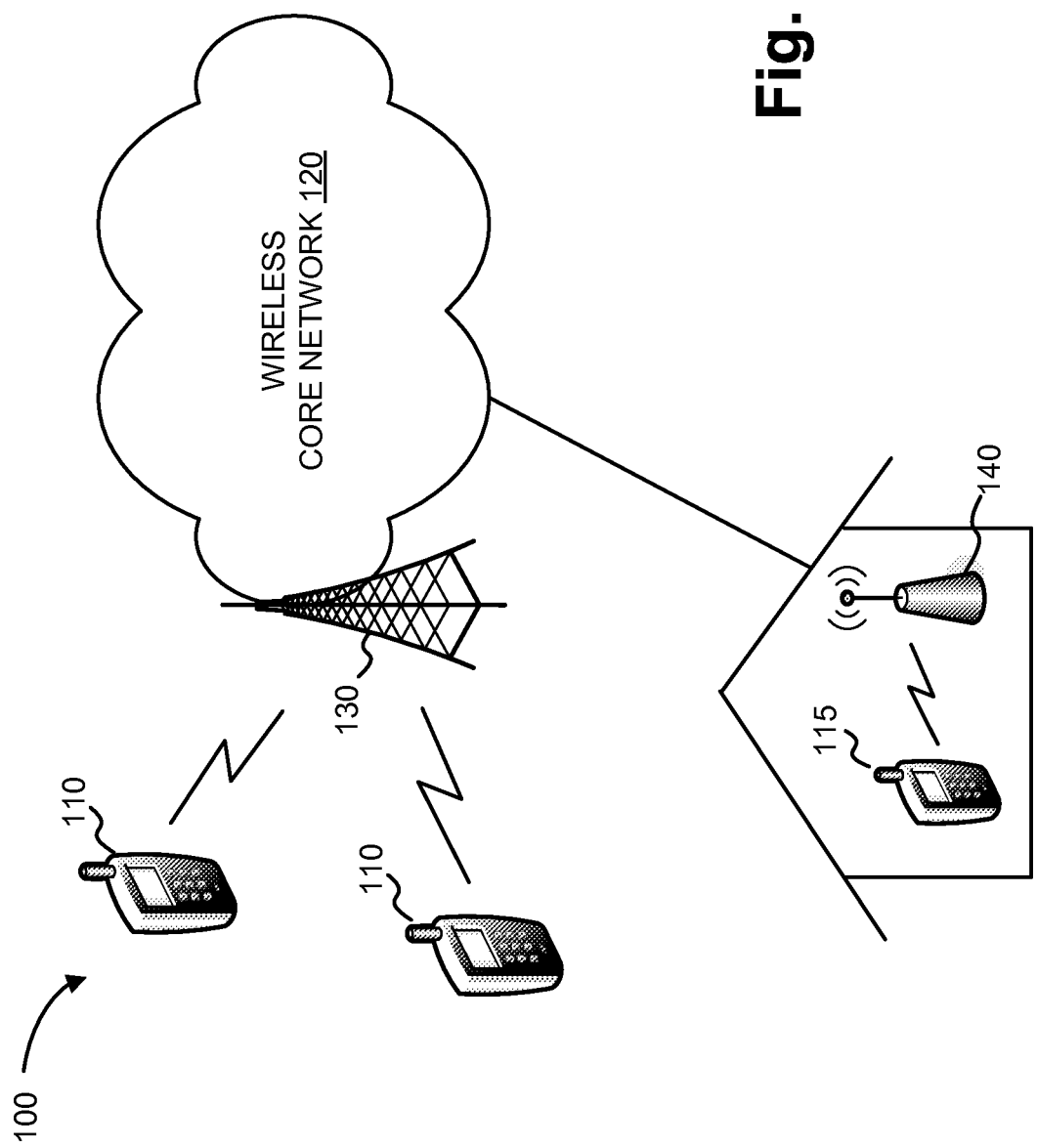
FIG. 1 is a diagram illustrating an exemplary system.

FIG. 1 is a diagram illustrating an exemplary system 100. System 100 may generally illustrate a wireless communication system based on the Long Term Evolution (LTE) mobile communication standard. In alternative implementations, other communication standards could be used.

As shown in FIG. 1, system 100 may include one or more client devices 110 and 115, such as mobile phones, that connect to wireless core network 120. Wireless core network 120 may be wirelessly accessed through base station 130 or femtocell 140. Client devices 110 and 115 may generally include devices designed to communicate with wireless core network 120. Client devices 110 and 115 may include, for example, mobile telephones, smart phones, electronic notepads, and/or personal digital assistants (PDAs). Client devices 110 and 115 may establish wireless communication sessions with base stations 130 or femtocells 140. The wireless communication sessions may be used for voice (e.g., telephone calls) or data sessions.

As particularly shown in FIG. 1, client devices 110 communicate with base station 130 and client device 115 communicates with femtocell 140. Base station 130 may represent a traditional base station designed to provide wireless communication service to a relatively large area and simultaneously serve a relatively large number of client devices 110. Base stations 130 may also be referred to herein as "macro cells" or "macro cell base stations." Femtocell 140 may include a device designed to be placed within a residence or small business setting and may connect to wireless core network 120 via a wired broadband connection. Femtocell 140 may act as a base station for a limited set of active client devices, such as up to four simultaneous client devices. Femtocells 140 may be self-installed by end-users in the residences of the end-users.

Although client devices 110 are shown in FIG. 1 as connecting to base station 130 and client device 115 is shown as connecting to base station 140, client devices 110 and 115 may each connect to either base station 130 or femtocell 140. In a typical implementation, client device 110/115 may connect to femtocell 140 when the femtocell is within range of the client device. When client device 110/115 moves out of a range of femtocell 140, client device 110/115 may switch the connection to base station 140, where the switch is ideally performed without interrupting the communication session of client device 110/115.

Wireless core network 120 may include components to implement the core network of the LTE standard. One implementation of such as core network includes the Evolved Packet Core (EPC) architecture. In other implementations, other network technologies, such as International Mobile Telecommunications-2000 ("3G"), or second-generation wireless telephone technology ("2G"), may alternatively or additionally be implemented instead of LTE. Components within wireless core network 120 may generally be connected over wired or wireless IP-based connections.

Figure 2:
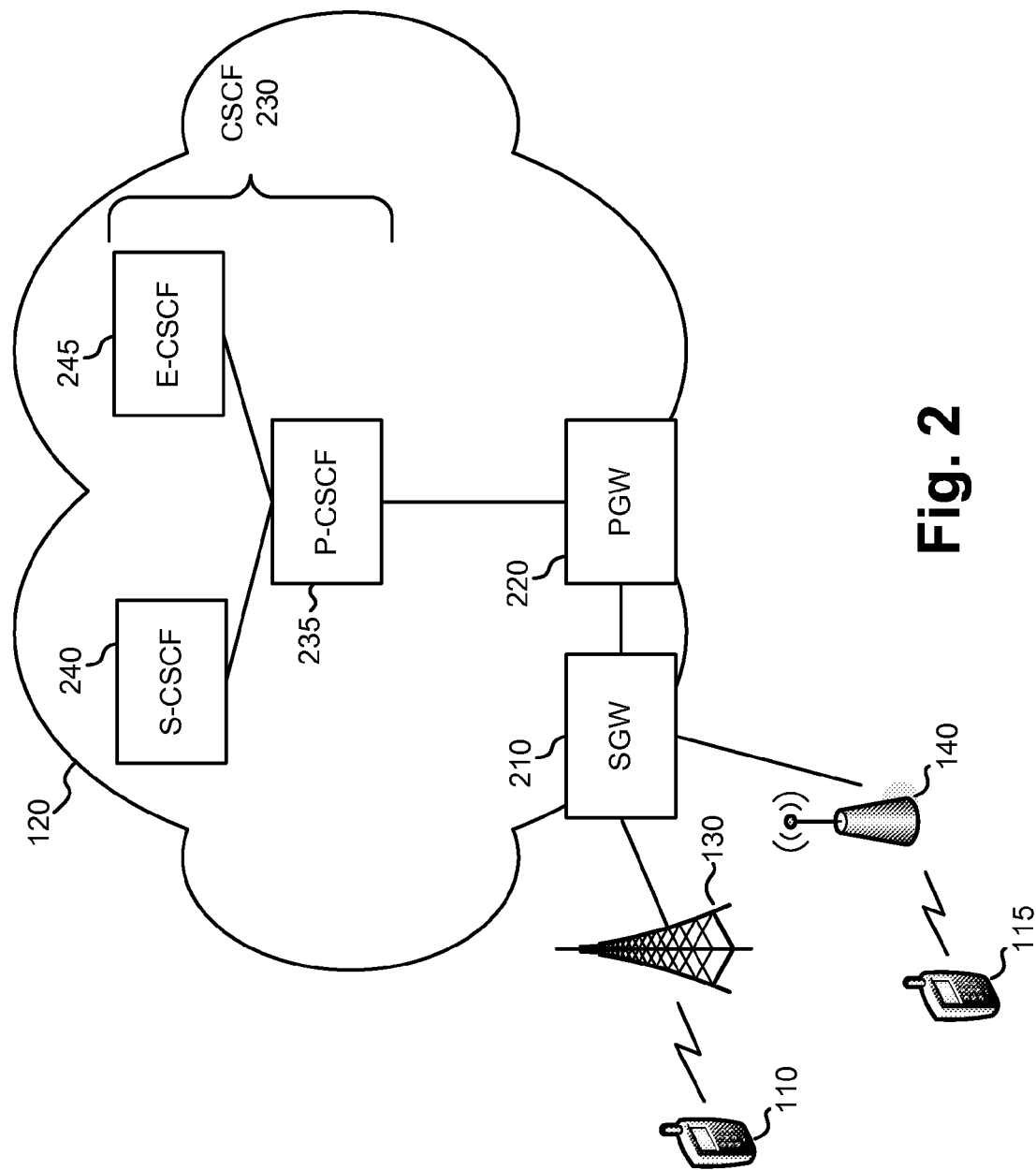
FIG. 2 is a diagram illustrating exemplary components of a wireless core network.

FIG. 2 is a diagram illustrating exemplary components of wireless core network 120. As shown, wireless core network 120 may include a signalling gateway (SGW) 210, packet gateway (PGW) 220, and call session control function (CSCF) components 230. CSCF components 230 may particularly include proxy call session control function (P-CSCF) server 235, serving call session control function (S-CSCF) server 240, and emergency call session control function (E-CSCF) server 245.

SGW 210 may perform signalling conversion between the transport used between base station 130 and femtocell 140 and the IP-based transport used within wireless core network 120.

PGW 220 may act as a gateway for wireless core network 120. PGW 150 may also provide connections to additional networks, such as a public IP-based network.

CSCF components 230 may include a number of SIP servers or proxies that process SIP signalling packets in the IMS system. P-CSCF server 235 may act as the first point of contact for client devices 110/115 for IMS services. Each client device 110/115 may be assigned a P-CSCF server 235 during registration of the client device. P-CSCF server 235 may subsequently operate in the signaling path of IMS messages.

S-CSCF server 240 may act as the central node for the IMS signalling plane for non-emergency calls. S-CSCF server 240 may connect to a database that includes data relating to the clients 110/115, such as authorization information, preferences, or other subscriber specific information. Based on the client information, S-CSCF server 240 may handle SIP registration of the clients, routing, and network policy enforcement. E-CSCF server 245 may perform functions similar to S-CSCF server 240, but for emergency calls. Thus, E-CSCF server 245 may act as the central node in the IMS signalling plane for emergency calls. E-CSCF server 245 may connect to a database to obtain client specific information.

Although FIG. 2 illustrates exemplary components of wireless core network 120, in other implementations, wireless core network 120 may include additional, fewer, different, or differently arranged components than those illustrated in FIG. 2 and described herein. For example, wireless core network 120 may include many SGWs 210, PGWs 220, P-CSCF servers 235, S-CSCF servers 240, and E-CSCF servers 245.

Figure 3:
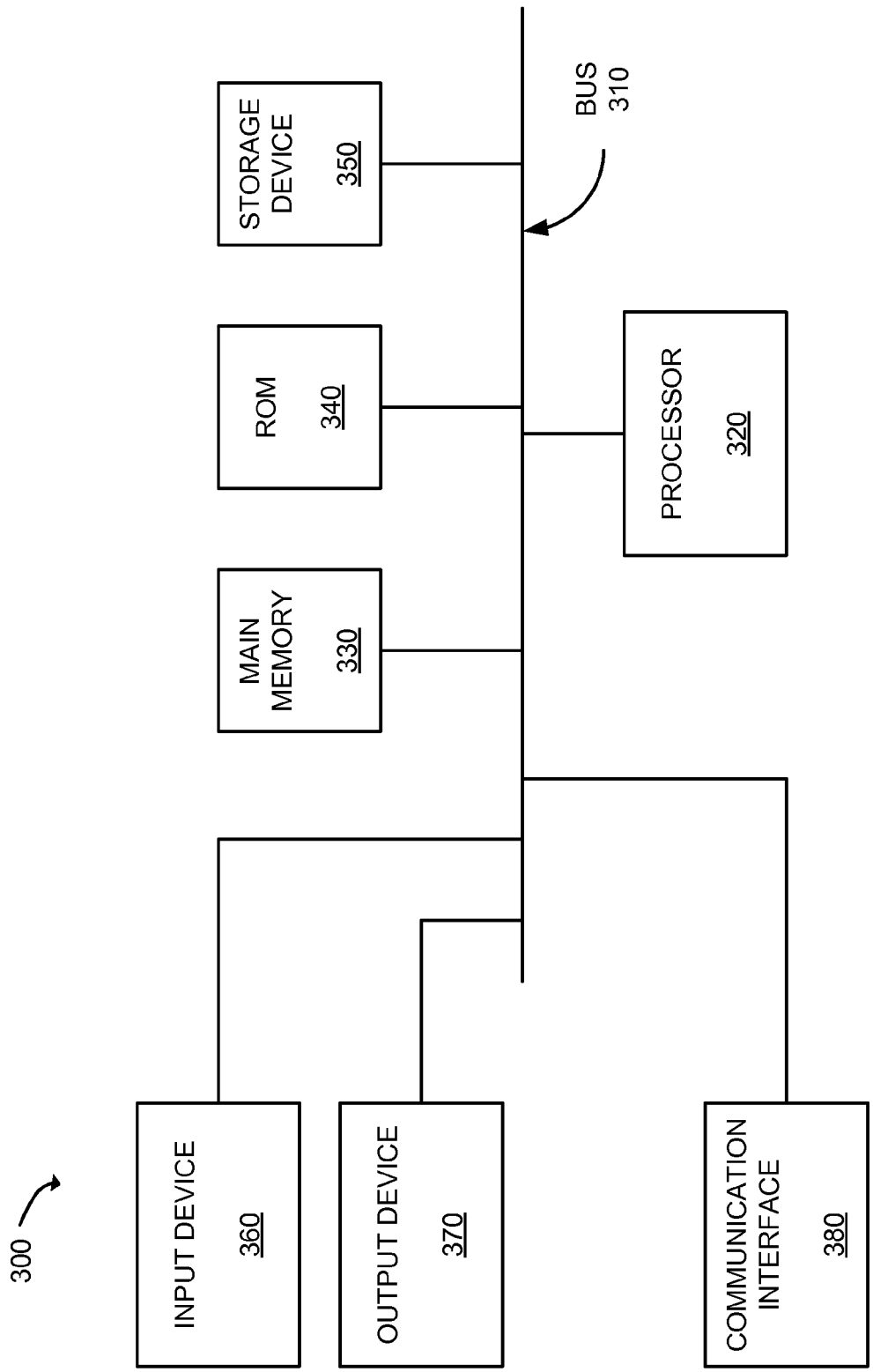
FIG. 3 is a diagram of exemplary components of a device, such as a network device in the wireless core network shown in FIG. 2.

FIG. 3 is a diagram of exemplary components of a device 300, which may correspond to a network device (e.g., server, database, SGW 210, PGW 220, P-CSCF server 235, S-CSCF server 240, and/or R-CSCF servers 245) in wireless access network 120, or a client device 110/115. As shown in FIG. 3, device 300 may include a bus 310, a processor 320, a main memory 330, a read only memory (ROM) 340, a storage device 350, an input device 360, an output device 370, and a communication interface 380. In another implementation, device 300 may include additional, fewer, different, or differently arranged components than are illustrated in FIG. 3.

Bus 310 may include a path that permits communication among the components of device 300. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to device 300, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables device 300 to communicate with other devices and/or systems. For example, communication interface 380 may include mechanisms for communicating with another network device. In some implementations, input device 360 and/or output device 370 may not be implemented by device 300. For example, device 300 may represent a network device such as SGW 210, PGW 220, P-CSCF server 235, S-PCSF server 240, or E-CSCF server 345. In these situations, device 300 may be a "headless" device that does not explicitly include an input or an output device.

As will be described in detail below, devices 300 may perform certain operations relating to location-based routing of calls through femtocells. Devices 300 may perform these operations in response to processor 320 executing software instructions contained in a computer-readable medium, such as main memory 330. A computer-readable medium may be defined as a logical or physical memory device. A logical memory device may include a space within a single physical memory device or spread across multiple physical memory devices.

Although FIG. 3 illustrates exemplary components of device 300, in other implementations, device 300 may include additional, fewer, different, or differently arranged components than those illustrated in FIG. 3 and described herein.

Figure 4:
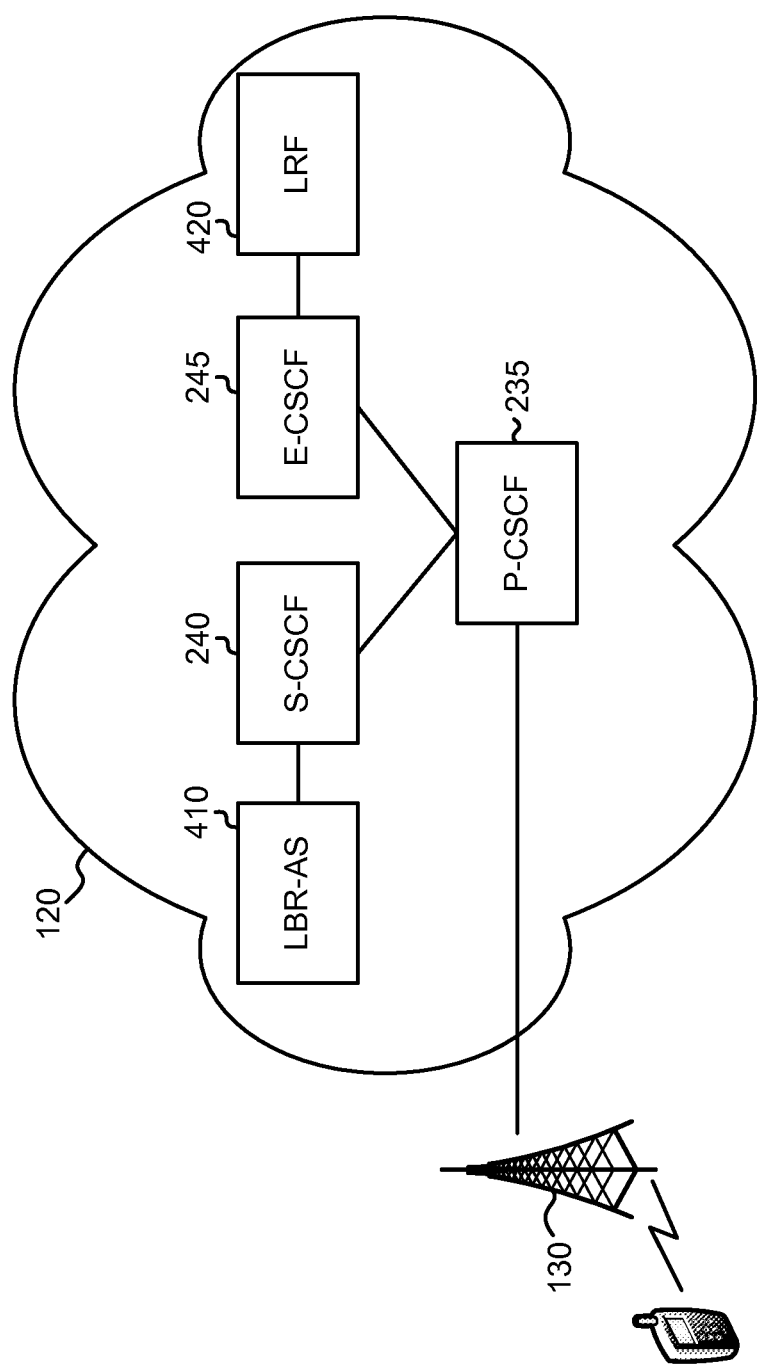
FIG. 4 is a diagram illustrating exemplary components in a wireless core network that may be relevant to establishing a location-based call through a macro cell base station.

FIG. 4 is a diagram illustrating exemplary components in wireless core network 120 that may be relevant to establishing a location-based call through a macro cell base station 130. The location-based call may be, for example, a N11 (e.g., 9-1-1) or a short code call that initiates a service that uses the callers location (e.g., a short code #PIZZA, which connects the caller to a local pizza restaurant). Wireless core network 120, in FIG. 4, is illustrated as a simplified version of wireless core network 120, as shown in FIG. 2, but additionally includes components relating to location-based calling through macro cell base station 130.

As shown in FIG. 4, S-CSCF server 240 may include or connect to location-based routing (LBR-AS) component 410. LBR-AS 410 may implement a translation table that maps a sector identifier ("SectorID(m)") associated with macro cell base station 130 to a destination Request-URI (uniform resource identifier). The term "SectorID(m)," as used herein, may refer to a unique identification number assigned to base stations, a base station RF identifier, or a combination of these values. The sector identifier may generally include a label that may be used to associate macro cell base station 130 with a geographic location. The Request-URI may specify a new destination for the call, where the new destination may be determined based on the SectorID(m) associated with macro cell base station 130. Because SectorID(m) is associated with a particular location, the Request-URI may be determined based on the location of the caller. LBR-AS 410 may be implemented as part of S-CSCF server 240 or, alternatively, as a separate physical server.

As is further shown in FIG. 4, E-CSCF 245 may include or connect to location resource function (LRF) component 420. LRF 420 may map the SectorID(m) associated with macro cell base station 130 to a destination Request-URI, and possibly other emergency call information, through which an emergency call may be completed. LRF 420 may be implemented as part of E-CSCF server 245 or, alternatively, as a separate physical server.

FIG. 5 is a diagram illustrating an exemplary data structure 500, which may be used by LBR-AS 410 or LRF 420 when determining Request-URIs for location-based calling. Data structure 500 may include SectorID(m) field 510, called number/service field 520, and Request-URI field 530. The combination of a particular SectorID and called number/service may correspond to a particular destination device, telephone number, or service, which may be represented as a URI stored in Request-URI field 530.

Sector ID field 510 may include SectorID(m) values for each of a number of macro cell base stations 130. As previously mentioned, each SectorID(m) may be associated with a particular geographic location. Accordingly, each SectorID field value may be used as a location parameter for location-based call routing. SectorID(m) values for macro cell base stations may be obtained by LBR-AS 410 or S-CSCF 240 during configuration or during a network discovery operation. A number of exemplary SectorID(m) values (10, 125, 50, and 1) are illustrated in FIG. 5.

Called number/service field 520 may represent the telephone number or service requested by the caller. For example, called number/service field 520 may include values that represent location-based short codes, N11 telephone numbers, or other call or service identifiers. A number of exemplary called number/service values are particularly shown in FIG. 5, including "#PIZZA," "4-1-1", and "7035551212." "#PIZZA" may be a short code that connects the caller to a pizza delivery restaurant near the caller. Based on the SectorID(m) associated with the caller, calls to "#PIZZA" may be associated with different Request-URIs (i.e., callers from different locations may be connected to different pizza restaurants). Similarly, based on the SectorID(m) associated with the caller, calls to "4-1-1" (directory assistance) may be routed to a Request-URI (e.g., a destination party) that handles the callers' location.

Request-URI field 530 may include a SIP URI to which a SIP request message is to be sent. The Request-URI may thus be a reference to the callee. Through the lookup operation performed using data structure 500, location-based call routing may be performed.

Data structure 500 is particularly shown as a lookup table in FIG. 5, such as a lookup table stored in computer readable media of LBR-AS 410, S-CSCF server 240, LRF 420, or E-CSCF server 245. In other implementations, the location-based call routing implemented by data structure 500 may be implemented in other ways, such as through a relational database, a file-based lookup, etc.

FIGS. 6A and 6B are diagrams illustrating exemplary call flows for performing location-based routing of calls through macro cell base stations, where location-based routing is performed using the SectorID(m) of the macro cell base station.

FIG. 6A particularly illustrates location-based routing for a non-emergency call. Macro cell base station 130 may forward a SIP INVITE message (message 610) from client device 110. The SIP INVITE message may include the SectorID(m) of macro cell base station 130, labeled as "SectorID(m)" in FIG. 6A.

Message 610 may be forwarded through SGW 210 and PGW 220 to P-CSCF 235. P-CSCF server 235 may examine the dialed digits, which may be included with message 610, to determine if the dialed digits indicate that the call is a non-emergency location-based call. If so, P-CSCF server 235 may pass message 610 to S-CSCF server 240 (message 615). S-CSCF 245 may further forward the message to LBR-AS 410 (message 620). LBR-AS 410 may map information from the INVITE message, such as SectorID(m) and the called number, to a new destination Request-URI. One example of such a mapping was discussed previously with respect to FIG. 5. LBR-AS 410 may then return the INVITE message, including the new Request-URI, message 625, back to S-CSCF 240, which may forward the message on its way to the destination specified by the new Request-URI.

FIG. 6B particularly illustrates location-based routing for an emergency call. Macro cell base station 130 may forward a SIP INVITE message (message 640) from client device 110. The SIP INVITE message may include the SectorID(m) of macro cell base station 130.

Message 640 may be forwarded through SGW 210 and PGW 220 to P-CSCF 235. P-CSCF 235 may examine the dialed digits, which may be included with message 640, to determine if the dialed digits indicate that the call is an emergency location-based call. If so, P-CSCF 235 may pass message 640 to E-CSCF server 245 (message 645). E-CSCF server 245 may further forward the message to LRF 420 (message 650). LRF 420 may map information from the INVITE message, such as SectorID(m) and the called number, to a new destination Request-URI that corresponds to an emergency service that handles emergencies near the location of the caller. LRF 420 may then return the routing information (and possibly other information) as a 300 MC (multiple choice) message, message 655, back to E-CSCF 245, which may forward the message on its way to the destination specified by the new Request-URI (e.g., the correct public server answering point).

As previously mentioned, femtocells 140 may function to provide telephony services to mobile devices that is similar to that provided by macro cell base stations 130. In contrast to macro cell base stations, however, there may be a larger number of femtocells, which may frequently be moved or powered down. Consistent with aspects described herein, location-based calls may be supported by an IMS system in which calls are originated through femtocells.

Figure 7:
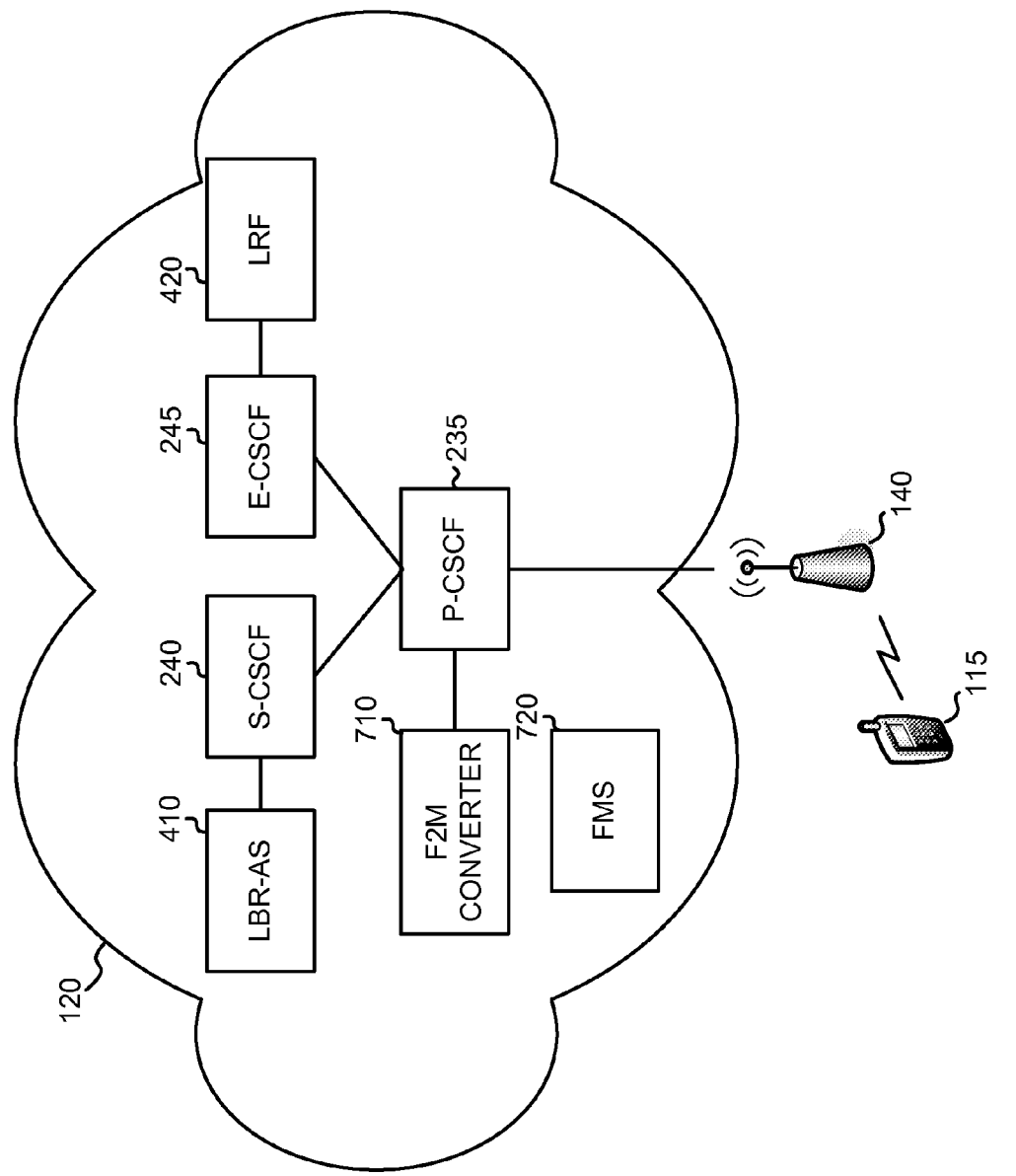
FIG. 7 is a diagram illustrating exemplary communications in wireless core network that may be relevant to establishing a location-based call through a femtocell.

FIG. 7 is a diagram illustrating exemplary communications in wireless core network 120 that may be relevant to establishing a location-based call through a femtocell 140. The location-based call may be, for example, a N11 call or a short code call that initiates a service that uses the callers location. Wireless core network 120, in FIG. 7, is illustrated as a simplified version of wireless core network 120, as shown in FIGS. 2 and 4, but additionally includes components relating to location-based calling through femtocell 140. These additional components include femtocell-to-macro cell (F2M) converter 710 and femto management server (FMS) 720.

As shown in FIG. 7, P-CSCF 235 may include or connect to F2M converter 710. F2M converter 710 may implement a translation table that maps the sector ID associated with femtocell 140, SectorID(f), to the sector ID associated with a macro cell base station 130, SectorID(m), that is located in a geographic location that is near or overlapping the location of the femtocell.

FMS 720 may be, for example, a server or process implemented as part of F2M converter 710 that manages the configuration of femtocells 140. Femtocells 140 may contact FMS 720 when the femtocell is initially turned-on or when the femtocell is moved. FMS 720 may store the location of the femtocells as well as an association of a macro cell that has a geographical coverage area that includes the femtocell. FMS 720 may provide this information to F2M converter 710.

In one implementation, F2M converter 710 and FMS 720 may be implemented as part of P-CSCF 235. Alternatively, F2M converter 710 and FMS 720 may be each be implemented as separate servers in wireless core network 120.

FIG. 8 is a diagram illustrating an exemplary data structure 800, which may be used by F2M converter 710 when mapping the sector ID associated with femtocell 140, SectorID(f), to the sector ID associated with a macro cell base station 130, SectorID(m). Data structure 800 may include a SectorID(f) field 810 and a SectorID(m) field 820. Data structure 800 may thus be used to lookup the corresponding SectorID(m) field 820 for any input SectorID(f) field 810. Multiple different SectorID(f) fields 810 may map to a single SectorID(m) field 820. As particularly shown in exemplary data structure 800, the SectorID(f) value f35 and f100 (corresponding to two different femtocells), are both associated with a single macro cell base station, which has a SectorID(m) value of 10.

Data structure 800 is particularly shown as a lookup table in FIG. 8, such as a lookup table stored in computer readable media of F2M converter 710. In other implementations, the lookup implemented by data structure 800 may be implemented in other ways, such as through a relational database, a file-based lookup, etc.

Figure 9:
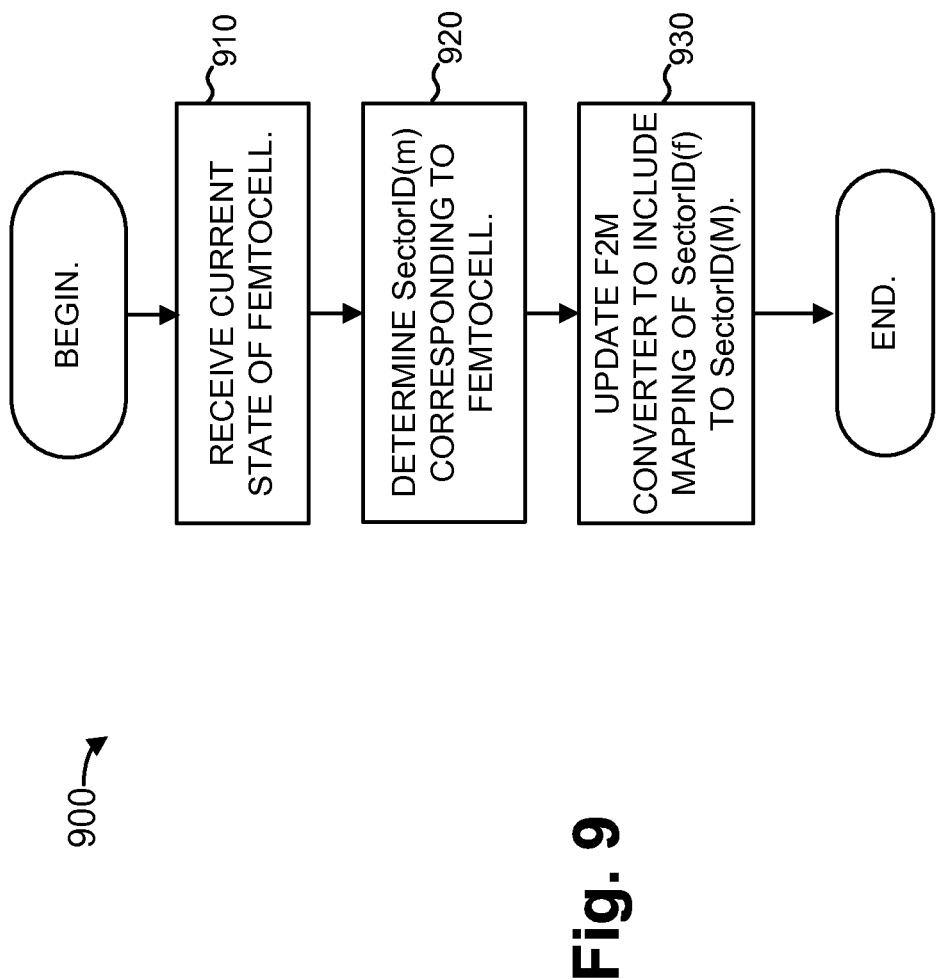
FIG. 9 is a flow chart illustrating an exemplary process for updating a data structure.

FIG. 9 is a flow chart illustrating an exemplary process 900 for updating data structure 800. Process 900 may be performed by FMS converter 720 based on communications with mobile devices 115 and/or femtocells 140, and F2M converter 710.

Process 900 may include receiving the current state of a femtocell 140 (block 910). Femtocells 140 may be designed to inform FMS 720 whenever the state of femtocell 140 changes. For instance, in response to being turned on (or off) or in response to a change in location, such as a user moving femtocell 140, femtocell 140 may send a message to FMS 720 indicating the state of femtocell 140. The state information may include the sector identifier, SectorID(f), of the femtocell, as well as the location of the femtocell. The state information may be transmitted through a packet-based network, such as via the broadband connection of the femtocell.

In some implementations, service providers may require that femtocell owners use the femtocell from a particular location. For example, a femtocell issued to a business may be enabled to operate only in a particular location. The femtocell may include mechanisms for detecting location changes, such as detecting a location change based on the femtocell being connected through a different broadband connection than the one for which it was originally provisioned. The femtocell user may be required to contact the service provider before being allowed to change the location of the femtocell. In this situation, the state information sent by femtocell 140 may not need to include the location of the femtocell. In some implementations in which the installed location of the femtocell is not permitted to change, process 900 may not be optional, as the location of femtocell 140 may be a static parameter.

Process 900 may additionally include determining the SectorID(m) of a macro cell corresponding to femtocell 140 (block 920). FMS 720 may store a list of known macro cell base stations and the geographical coverage areas of the base stations. FMS 720 may match the coverage areas of the macro cell base stations to the location of the femtocell to identify a macro cell (i.e., the sector identifier, SectorID(m), of the macro cell) in which the coverage area of the macro cell base station includes the femtocell.

Process 900 may additional include updating data structure 800 in F2M converter 710 to include a mapping between the determined macro cell base station sector identifier, SectorID(m), and the sector identifier of the femtocell, SectorID(f), (block 930).

In some situations, the determination performed in block 920 may result in a determination that there is no macro cell base station that covers the femtocell. In other words, the femtocell may be located in an area in which there is no wireless coverage. In this situation, FMS 720 may create a "virtual" macro cell base station that includes a virtual coverage area that includes the femtocell. The existence of the virtual macro cell base station may be input to LBR-AS 410 and LRF 420 as if it were a real macro cell base station.

Figure 10:
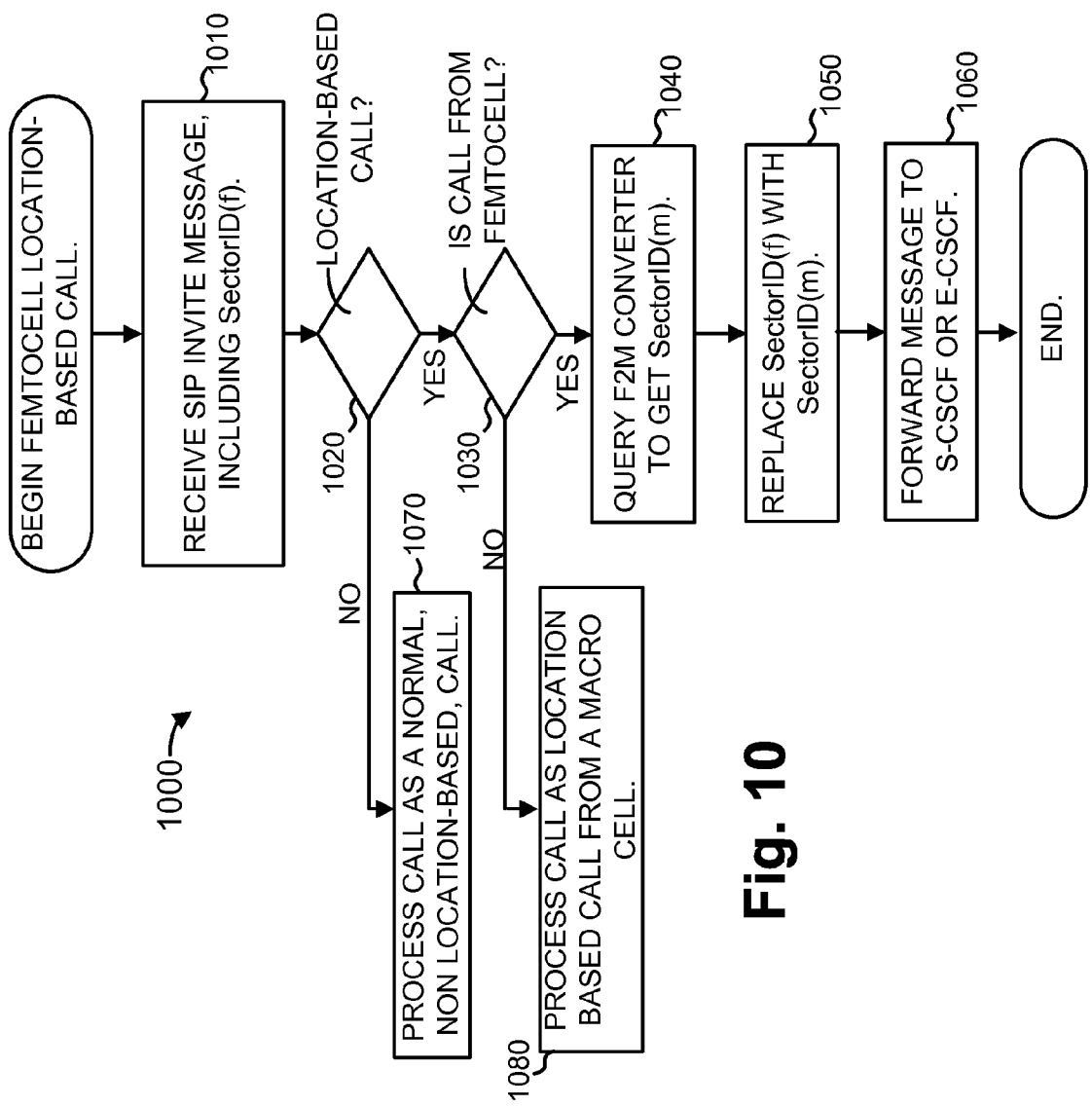
FIG. 10 is a flow chart illustrating an exemplary process for performing location-based call routing for calls handled by femtocells.

FIG. 10 is a flow chart illustrating an exemplary process 1000 for performing location-based call routing for calls handled by femtocells.

Process 1000 may include receiving an indication that a call is being placed by a user of mobile device, such as by receiving a SIP INVITE message at P-CSCF server 235 (block 1010). The INVITE message may have been generated by mobile device 115 in response to the user initiating a telephone call. The sector identification of the femtocell through which the mobile device is connected, SectorID(f), may be included with the INVITE message. The invite message may be forwarded through femtocell 140, SGW 210, and PGW 220, to P-CSCF server 235.

Process 1000 may additionally include determining whether the INVITE message is for a location-based call (block 1020). Whether a call is a location-based call may be determined based on the dialed digits. As previously mentioned, certain telephone numbers, such as certain N11 numbers, short codes, or other digits may be calls that may be routed to a called party based on the location of the caller. In one implementation, P-CSCF server 235 may compare the dialed digits to a list of known location-based telephone numbers to determine whether the call is a location-based call.

If the call is determined to not be a location-based call, (block 1020—NO), the call may be processed as a normal location-based call (block 1070). That is, P-CSCF server 235 may lookup the Request-URI for the call based on the dialed digits and may then forward the INVITE message towards the appropriate destination.

If the call, however, is determined to be a location-based call, (block 1020—YES), P-CSCF server 235 may also determine whether the call is from a femtocell (block 1030). P-CSCF server 235 may determine whether the call is from a femtocell based on the sector identifier in the INVITE message. If the call is determined to not be a call from a femtocell, (block 1030—NO), the call may be processed as a normal location-based call (block 1080). That is, P-CSCF server 235 may forward the INVITE message to S-CSCF server 240 or E-CSCF server 245 with the corresponding macro cell sector identifier, SectorID(m), included with the INVITE message. The call may then be processed as illustrated in FIGS. 6A and 6b, in which the sector identifier of the macro cell is used to route the call.

If the call is determined to be a call from a femtocell, (block 1030—YES), P-CSCF server 235 may query F2M converter 710 to get the sector identifier, SectorID(m), of the corresponding macro cell base station (block 1040). As discussed with respect to FIG. 8, F2M converter 710 may, for example, use SectorID(f) as an index to a lookup table to obtain SectorID(m). In some implementations, the query of F2M converter 710 may be performed by to S-CSCF server 240 and/or E-CSCF server 245 instead of P-CSCF server 235.

Process 1000 may further include replacing the sector identifier, SectorID(f), in the INVITE message with the sector identifier, SectorID(m), that was received from query to F2M converter (block 1050).

Process 1000 may further include forwarding the INVITE message to S-CSCF server 240 or E-CSCF server 245 (block 1060). The INVITE message may be forwarded to S-CSCF server 240 when the call is a non-emergency location-based call and forwarded to E-CSCF server 245 when the call is an emergency location-based call. At this point, the INVITE message includes the sector identifier of a macro cell base station near the location of the caller and the message may therefore continue to be routed as a "normal" location-based call, as discussed previously with respect to FIGS. 6A and 6B. Advantageously, from the point of view of S-CSCF server 240 or E-CSCF server 245, femtocell-based call routing can be performed without modification to S-CSCF server 240 or E-CSCF server 245.

Figure 11:
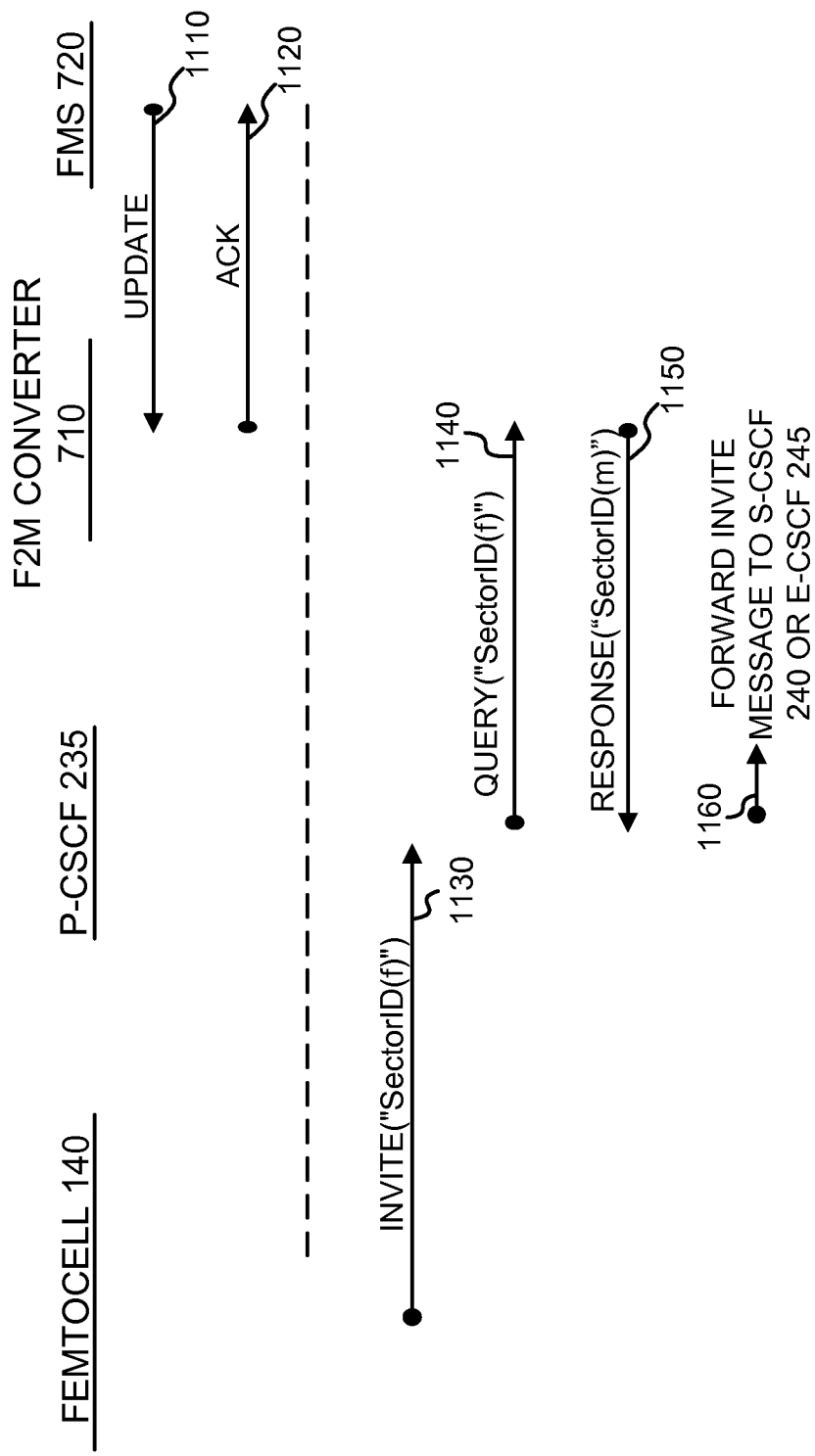
FIG. 11 is a diagram illustrating exemplary message flows for performing location-based routing of calls through femtocells.

FIG. 11 is a diagram illustrating exemplary message flows for performing location-based routing of calls through femtocells, such as that illustrated in process 1000.

FMS 720 may occasionally update F2M converter 710 with new or modified SectorID(f) to SectorID(m) mappings (UPDATE message 1110). As previously discussed, FMS 720 may keep track of active femtocells as well as an association of a macro cell base station that has a geographical coverage area that includes the femtocell. FMS 720 may provide this information to F2M converter 710 through UPDATE message 1110. F2M converter 710 may acknowledge the update received from FMS 720 (ACK message 1120).

Messages 1110 and 1120 represent operations of FMS 720 and F2M converter 710 in maintaining an up-to-date mapping of SectorID(f) to SectorID(m) values. The mapping may be used in routing a location-based femtocell call, as illustrated in messages 1130 through 1160.

Femtocell 140 may forward a SIP INVITE message (message 1130) from client device 115. The SIP INVITE message may include the SectorID(f) of femtocell 140.

Message 1130 may be forwarded through SGW 210 and PGW 220 to P-CSCF 235. P-CSCF server 235 may recognize the sector identifier as one corresponding to a femtocell, and issue a query to F2M converter 710 (QUERY message 1140). F2M converter 1140 may lookup the sector identifier of the femtocell in data structure 800 and may respond to P-CSCF 235 with the corresponding sector identifier, SectorID(m), of the macro cell that has a geographical coverage area that includes the femtocell (message 1150—RESPONSE("SectorID(m)")). P-CSCF server 235 may then forward the INVITE message, include SectorID(m), to S-CSCF server 240 or E-CSCF server 245 (message 1160).

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 9 and 10, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
  receiving, by a network device, a message initiating a call from a mobile device,
    the message including an identifier of a femtocell, in a telephone network, through which the call was placed;
  determining, by the network device, that the call is a location-based call that is to be routed to a particular destination based on a location of the mobile device;

obtaining, by the network device and after determining that the call is the location-based call, an identifier of a macro cell base station that serves a geographical coverage area that includes the femtocell;

replacing, by the network device and while the mobile device is connected to the network device through the femto cell, the identifier of the femtocell, in the message, with the identifier of the macro cell base station to obtain a modified message;

determining, by the network device, that the call is an emergency call; and forwarding, by the network device and after determining that the call is the emergency call, the modified message to an emergency call session control function (E-CSCF) server.

2. The method of claim 1, where obtaining the identifier of the macro cell base station includes:
   issuing a query to obtain, based on the identifier of the femtocell, the identifier of the macro cell base station, and
   receiving the identifier of the macro cell base station.

3. The method of claim 2,
   where the query is issued to a device that stores a mapping between identifiers of femtocells to identifiers of macro cell base stations,
   where the femtocells include the femtocell, and
   where the macro cell base stations include the macro cell base station.

4. The method of claim 1, where the network device includes a proxy call session control function (P-CSCF) server.

5. The method of claim 1, where the identifier of the macro cell base station includes an identifier that corresponds to a virtual macro cell base station.

6. The method of claim 1, where the telephone network includes an Internet Protocol Multimedia Subsystem (IMS) based network.

7. The method of claim 1, further comprising:
   receiving another message initiating another call,
   determining that the other call is a non-emergency call, and
   forwarding, after determining that the other call is the non-emergency call, information based on the other message to a serving call session control function (S-CSCF) server.

8. The method of claim 1, where the message initiating the call includes information identifying a location-based N11 telephone number or a short code call.

9. The method of claim 1, where determining that the call is the location-based call includes:
   determining that the call is the location-based call based on information regarding one or more digits entered on the mobile device to place the call.

10. A network device comprising:
    one or more processors to:
      receive a message initiating a call from a mobile device, the message including an identifier of a femtocell, in a telephone network, through which the call was placed;
      determine that the call is a location-based call that is to be routed to a particular destination based on a location of a device used to place the call;
      obtain, after determining that the call is the location-based call, an identifier of a macro cell base station that serves a geographical coverage area that includes the femtocell;
      replace, while the mobile device is connected to the network device through the femtocell, the identifier of the femtocell, in the message, with the identifier of the macro cell base station to obtain a modified message;
      determine that the call is an emergency call; and
      forward, after determining that the call is the emergency call, the modified message to an emergency call session control function (E-CSCF) server.

11. The network device of claim 10, where, when determining that the call is the location based call, the one or more processors are to:
    determine that the call is the location-based call based on information regarding one or more digits entered on the mobile device to place the call.

12. The network device of claim 10, where, when obtaining the identifier of the macro cell base station, the one or more processors are to:
    issue a query based on the identifier of the femtocell, and
    obtain the identifier of the macro cell base station based on the query.

13. The network device of claim 10,
    where the query is issued to a device that stores a mapping between identifiers of femtocells to identifiers of macro cell base stations,
    where the femtocells include the femtocell, and
    where the macro cell base stations include the macro cell base station.

14. The network device of claim 10, where the identifier of the macro cell base station includes an identifier that corresponds to a virtual macro cell base station.

15. The network device of claim 10, where the message initiating the call includes information identifying a location-based N11 telephone number or a short code call.

16. The network device of claim 10, where the network device includes a proxy call session control function (P-CSCF) server.

17. A system comprising:
    one or more processors to:
      receive state information relating to a state of femtocells operating in a telecommunications network,
        the state information including identifiers for the femtocells and locations of the femtocells;
      determine macro cell base stations that serve geographical coverage areas corresponding to the locations of the femtocells;
      update a data structure to store a mapping of the identifiers for the femtocells to identifiers associated with the macro cell base stations;
      receive a query that includes a particular identifier of a particular femtocell of the femtocells;
      determine, based on the data structure and the particular identifier, a looked-up identifier of a particular macro cell base station, of the macro cell base stations, that serves a geographical coverage area corresponding to a particular location of the particular femtocell; and
      respond to the query by returning the looked-up identifier for the particular macro cell base station.

18. The system of claim 17, where the query is received from a session initiation protocol (SIP) server in an Internet Protocol Multimedia Subsystem (IMS) based telecommunication network.

19. The system of claim 17, where the state information is received based on communication sessions between the femtocells and a femtocell management component that includes one or more of the one or more processors.

20. The system of claim 17, where the macro cell base stations include virtual macro cell base stations.

21. A non-transitory computer-readable medium storing instructions, the instructions comprising:

one or more instructions that, when executed by at least one processor, cause the at least one processor to:
receive identifiers for femtocells and information identifying locations of the femtocells;
determine identifiers associated with macro cell base stations that serve geographical coverage areas corresponding to the locations of the femtocells;
update a data structure to store a mapping of the identifiers for the femtocells to the identifiers associated with the macro cell base stations;
receive a query that includes a femtocell identifier of a particular femtocell of the femtocells;
determine, based on the data structure and the femtocell identifier, a macro cell identifier of a particular macro cell base station, of the macro cell base stations, that serves a geographical coverage area corresponding to a particular location of the particular femtocell; and
respond to the query by returning the macro cell identifier for the particular macro cell base station.

22. The non-transitory computer-readable medium of claim 21, where the one or more instructions to receive the query include:
one or more instructions that, when executed by the at least one processor, cause the at least one processor to:
receive the query from a session initiation protocol (SIP) server in an Internet Protocol Multimedia Subsystem (IMS) based telecommunication network.

23. The non-transitory computer-readable medium of claim 21, where the identifiers for the femtocells and the information identifying the locations of the femtocells are received based on communication sessions between the femtocells and a management component that includes the at least one processor.

* * * * *